United States Patent
Kenna et al.

(10) Patent No.: US 7,133,840 B1
(45) Date of Patent: *Nov. 7, 2006

(54) INTEGRATED NESTED ACCOUNT FINANCIAL SYSTEM WITH MEDICAL SAVINGS SUBACCOUNT

(76) Inventors: Janine S. Kenna, 400 E. 54th St., Apt 20H, New York, NY (US) 10022; Patrick B. Butler, 69 Whitney Rd., Short Hills, NJ (US) 07078; Thomas Musmanno, 8 Blue Jay Ct., Warren, NJ (US) 07059; Kelly Ur, 409 Dunhams Cir. Rd., E. Brunswick, NJ (US) 08816

( * ) Notice: Subject to any disclaimer, the term of this patent is extended or adjusted under 35 U.S.C. 154(b) by 1028 days.

This patent is subject to a terminal disclaimer.

(21) Appl. No.: 09/618,704

(22) Filed: Jul. 18, 2000

Related U.S. Application Data

(60) Division of application No. 09/172,796, filed on Oct. 14, 1998, now Pat. No. 6,108,641, and a continuation-in-part of application No. 08/586,288, filed on Jan. 16, 1996, now abandoned, which is a continuation-in-part of application No. 08/176,207, filed on Jan. 3, 1994, now Pat. No. 5,826,243.

(51) Int. Cl.
*G06Q 40/00* (2006.01)
*G06Q 10/00* (2006.01)
*G06F 15/16* (2006.01)
*G06F 15/167* (2006.01)

(52) U.S. Cl. .............................. 705/35; 705/2; 709/217
(58) Field of Classification Search ............... 709/208, 709/212, 217; 705/35, 2, 3, 4, 36, 39, 40
See application file for complete search history.

(56) References Cited

U.S. PATENT DOCUMENTS

| 4,346,442 | A | * | 8/1982 | Musmanno | 705/36 |
| 4,376,978 | A | * | 3/1983 | Musmanno | 705/36 |
| 4,491,725 | A | * | 1/1985 | Pritchard | 705/2 |
| 4,597,046 | A | * | 6/1986 | Musmanno et al. | 705/36 |
| 4,774,663 | A | * | 9/1988 | Musmanno et al. | 705/36 |
| 4,823,265 | A | * | 4/1989 | Nelson | 705/35 |
| 5,053,607 | A | * | 10/1991 | Carlson et al. | 705/18 |
| 5,101,353 | A | * | 3/1992 | Lupien et al. | 705/37 |
| 5,136,502 | A | * | 8/1992 | Van Remortel et al. | 705/2 |

(Continued)

FOREIGN PATENT DOCUMENTS

GB  2054928 A * 2/1981

(Continued)

OTHER PUBLICATIONS

The Use of Communications Networks to Increase Personal Privacy, N.F. Maxemchuck, AT&T Bell Laboratories.*

(Continued)

*Primary Examiner*—Beatriz Prieto
*Assistant Examiner*—Michael D. Meucci
(74) *Attorney, Agent, or Firm*—Morgan, Lewis & Bockius LLP; Steven D. Underwood

(57) ABSTRACT

A computer system for managing a plurality of accounts, each the accounts being separated into a master account and at least one subaccount associated therewith, and at least one of the subaccount being a medical saving account (MSA). Each subaccount incorporates a subset of features available for the master account, the features corresponding to the specific needs dictated by the purpose of the subaccount. The purpose of a subaccount, in addition to being an MSA, can include regular payments (e.g., mortgage and other loans), credit/debit card, retirement account, and the like.

10 Claims, 15 Drawing Sheets

U.S. PATENT DOCUMENTS

| | | | | |
|---|---|---|---|---|
| 5,191,522 A | * | 3/1993 | Bosco et al. | 705/4 |
| 5,193,056 A | * | 3/1993 | Boes | 705/36 R |
| 5,214,579 A | * | 5/1993 | Wolfberg et al. | 705/36 R |
| 5,220,501 A | * | 6/1993 | Lawlor et al. | 705/40 |
| 5,231,510 A | * | 7/1993 | Worthington | 358/400 |
| 5,301,105 A | * | 4/1994 | Cummings, Jr. | 705/2 |
| 5,319,543 A | * | 6/1994 | Wilhelm | 705/3 |
| 5,359,509 A | * | 10/1994 | Little et al. | 705/2 |
| 5,466,919 A | * | 11/1995 | Hovakimian | 705/17 |
| 5,483,445 A | * | 1/1996 | Pickering | 705/40 |
| 5,550,734 A | * | 8/1996 | Tarter et al. | 705/2 |
| 5,583,987 A | * | 12/1996 | Kobayashi et al. | 714/13 |
| 5,646,982 A | * | 7/1997 | Hogan et al. | 379/88.22 |
| 5,826,243 A | * | 10/1998 | Musmanno et al. | 705/35 |
| 5,884,271 A | * | 3/1999 | Pitroda | 705/1 |
| 5,933,815 A | * | 8/1999 | Golden | 705/35 |
| 6,044,352 A | * | 3/2000 | Deavers | 705/4 |
| 6,044,382 A | * | 3/2000 | Martino | 715/505 |
| 6,108,641 A | * | 8/2000 | Kenna et al. | 705/35 |
| 6,226,623 B1 | * | 5/2001 | Schein et al. | 705/35 |
| 6,401,079 B1 | * | 6/2002 | Kahn et al. | 705/30 |

FOREIGN PATENT DOCUMENTS

| | | | | |
|---|---|---|---|---|
| JP | | 57030461 A | * | 2/1982 |
| JP | | 62078677 A | * | 4/1987 |

OTHER PUBLICATIONS

Scott, Diana J. "Postretirement Benefits: To Cure Financials, Take a Scalpel to FAS 106 Liability"; Corporate Cashflow v13n9; pp. 16-22; Aug. 1992.*

* cited by examiner

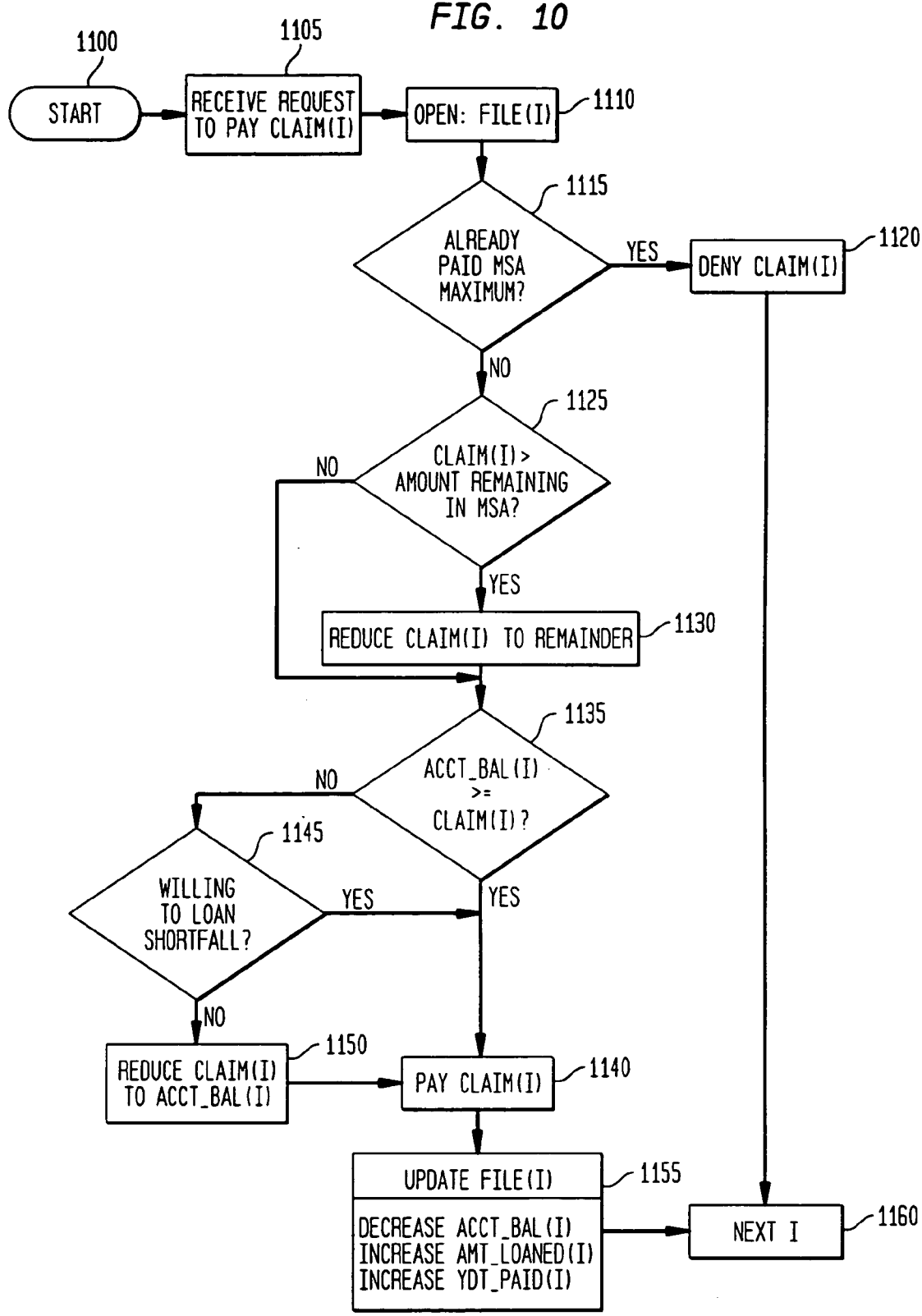

INTEGRATED NESTED ACCOUNT FINANCIAL SYSTEM WITH MEDICAL SAVINGS SUBACCOUNT

This application is a divisional of U.S. patent application Ser. No. 09/172,796, filed Oct. 14, 1998 (now U.S. Pat. No. 6,108,641), which is a continuation in part of U.S. patent application Ser. No. 08/176,207, filed Jan. 3, 1994 (now U.S. Pat. No. 5,826,243) and U.S. patent application Ser. No. 08/586,288, filed Jan. 16, 1996 now abandoned. The disclosures of each of the above applications are incorporated herein by reference.

FIELD OF THE INVENTION

The present invention generally relates to computer managed financial business systems. More specifically the invention provides data processing methods and apparatus for directing an account management system which incorporates master accounts with a plurality of nested subaccounts having a specific subset of individual properties, and especially to a system having at least one a nested subaccount that is a Medical Savings Account (MSA).

BACKGROUND OF THE INVENTION

The financial world has been enhanced by the ability to use computers to manage assets. Financial institutions extensively employ elaborate computer systems to direct and process the numerous accounts retained on behalf of the customers. These accounts routinely track individual assets for the account holder and permit timely updating thereof pursuant to transactions made by the account holders in accordance with the account restrictions. These systems are directed to accounts such as brokerage accounts wherein securities may be bought and sold with a minimal amount of paper work as the transactions and recordations thereof is fully automated within the computer.

More recently, systems have been developed that permit the integration of disparate types of accounts for a single account holder thus expanding substantially the account holders ability to control his/her assets. This is exemplified by the CMA® accounts which incorporate traditional check writing and credit/debit card features with brokerage and mutual fund accounts for a single user—integrated in a seamless fashion from the user's vantage.

The above-noted integrated account systems are best exemplified from a processing standpoint by the specific parents directed to their implementation. More particularly, U.S. Pat. Nos. 4,346,442, 4,376,978, 4,597,046 and 4,774,663 are directed to such integrated account processing by one or more digital computers and are herein incorporated by reference as if restated in full. Generally, the above-identified patents disclose a computer system for directing a plurality of securities brokerage/cash management accounts. That system, inter alia, supervises, implements and coordinates a margin securities brokerage account, and permits participation in one or more short term investments (e.g., money market or comparable funds).

In recent times, there has been an increasing desire by individual account holders to segment account functions into separately managed areas of financial interest. For example, account holders often desire the ability to provide separate account functions to other members of their families, or to separate specific expenses on an account basis, e.g., mortgage payments, etc. In the past, this has been accomplished by simply opening new accounts, fully featured, directed to the specific family member and/or specific expense. By pursuing this tack, the account holder develops multiple disparate accounts—often functionally equivalent, but without inter-communication therebetween. The fallout of this is excessive expenditures in maintaining multiple accounts that lack any coordination and thus become difficult to manage by the individual.

Moreover, a financial management institution such as a brokerage house handles accounts for thousands of people, usually with each person having two or more separate accounts (i.e., a checking account, a money market account for long-term goals and a savings account). The lack of integration between multiple accounts held by the same individual or individuals within the same household introduces, from the brokerage house perspective an additional level of record keeping requirements and thus a corresponding increase in fees to the account holder. It was within the framework of the above understanding that the subject concept of nested integrated accounts was developed.

On the other side of this invention, one specific type of account has been proposed and undertaken to contain and manage the upward spiral of health care costs. Most reforms at health care costs, including managed care, deal primarily with the supply side of health care and are based on concepts of reducing or controlling costs, including administrative costs, and restricting access to providers. These approaches limit the patient's freedom of choice, inhibit the physician/patient relationship, degrade the quality of care, and perhaps even increase costs by transferring the financial responsibility from patients to third parties, resulting in increased demand for services by patients who do not have to lay out personal funds.

The particular account used for the Master/Subaccount relationship is a Medical Savings Account (MSA). The MSA is a new tax-advantaged savings account made possible by U.S. Congressional Legislation passed in 1996 for availability in 1997. These MSAs are emerging as an important means of restoring financial control of health care transactions to individual patients. Within the structure of the present subaccount system, the MSA subaccount will allow eligible individuals to merge one of life's most critical concerns healthcare expenses within the frame work of their entire financial portfolio. The central focus of this approach is on the demand side of health care. Since cost is a function of utilization, health care costs decrease when utilization decreases, which in turn occurs when people have the direct responsibility to pay for it. MSAs are a combination of high-deductible health insurance (sometimes referred to as catastrophic insurance) with a pre-funded, dedicated cash account to provide first-dollar coverage for all expenses up to the deductible. A properly managed MSA, be it employer-sponsored or an individual account, has the potential to reduce unnecessary claims paperwork, to increase direct employee compensation, and ultimately to reduce the aggregate cost of health care expenditures for both individual subscribers and employers.

In an employer-sponsored plan, the reduced premiums on the high-deductible insurance policy enables the employer to fund all, or a portion of, the annual cash contribution to the employee/subscriber's MSA. Any funds not expended from the MSA at the end of the year belong to the employee/subscriber.

In an individual or single coverage plan, the subscriber funds his own MSA, again, all or in part with the savings from the reduced insurance premiums. Recently proposed legislation provides tax treatment for MSAs similar to that of individual retirement accounts (IRAs), although withdrawals for medical purposes will not be taxed or penalized.

In either an employer-sponsored or individual MSA, the assets in the MSA belong to the subscriber. There is, therefore, a strong incentive for the subscriber to utilize only those medical services which are truly necessary, and to obtain the most economical service available. In other words, the physician/patient relationship takes on the essence of a traditional arms length business transaction with the patient shopping for the best value for his money, yet retaining complete decision making autonomy. Any year-end balance is controlled by the subscriber and may be used for future health care expenses, by law, funds not recovered from the account for medical expenses may also be invested in most of the products permitted in IRAs in order to allow the account holder to save times for future expenses, for retirement savings, or as the person desires.

Current implementations of the MSA concept suffer from the inhibition of fluid interaction and exchange of real-time information among financial services institutions, insurers, employers, and individual subscribers. Accordingly, the present invention is directed to a data processing system for implementing the MSA concept including: real-time transactions handling; paperless claims administration; provision for automatic conversion (with uninterrupted coverage) between employer-sponsored and individual subscriber MSAs; exchange of timely electronic information from the point of sale to both insurer and financial service institution; and most significantly, automated deposit and investment of funds; and provision for client modification of account parameters.

OBJECTS AND SUMMARY OF THE PRESENT INVENTION

It is an object of the present invention to provide an improved brokerage/cash management system. It is another object of the present invention to enable individuals to easily and cost effectively manage their assets and have a concise, clear understanding of the value of their assets. It is a further object of the present invention to enable an individual to delineate short and long term assets into a composite account with a single master account and a number of subaccounts which are linked within the composite account. It is another feature of the present invention to allow individuals in the same household or family to create a single composite account for all their funds.

It is another object of the present invention to provide a system to implement an MSA. Yet another object of the present invention to provide a data processing system that manages a plurality of separate accounts for participating individuals and to update a patient database accordingly. It is yet another object of the present invention to provide a system to keep track of each subscriber's medical expenses and deposits and to link this database with various auxiliary services, such as a health insurance provider within the framework of the household relationship.

The above and other objects of the present invention are realized in a novel data processing system designed to manage a plurality of subaccounts, at least one of which is an MSA. The present subaccount system provides an account which includes at least one master account having one or more functional capabilities such as check writing, credit/debit card management, access to brokerage services, etc. The master accounts are linked to one or more nested subaccounts which are separately directed to a subset of features falling within the master account, said features corresponding to the specific needs associated with the purpose of that subaccount. Record keeping between the master and its associated subaccounts is done on an integrated basis as each subaccount is specifically linked and controlled by the parameters associated with its master.

The present invention utilizes as a system thereof, for at least one subaccount, a combination comprising a subscriber account entry means for selectively receiving subscriber parameters and creating an associated account database entry where each MSA subaccount in the database includes information regarding the subscriber, parameters defining allowable contributions to and withdrawals from the MSA subaccount, contributions to the MSA subaccount, and associated medical expenditures paid from the MSA subaccount; a subscriber MSA subaccount processing means for performing periodic account maintenance transactions based upon the subscriber parameters and updating the MSA subaccount database in accordance therewith; the subscriber MSA subaccount processing means further comprising means for receiving medical claim-related data inputs including medical expenses to be paid from the subscriber's MSA subaccount; and means responsive to the received claim inputs for allocating and making payment from the subscriber's MSA subaccount in accordance with the subscriber parameters and for updating the MSA subaccount database in accordance therewith.

The account also facilitates the automated investment of liquid investments at the client's discretion.

The foregoing and additional features and advantages of the instant invention will become more readily apparent from the following detailed description of a specific illustrative embodiments thereof.

BRIEF DESCRIPTION OF THE FIGURES

FIG. 10 is a logic flow diagram illustrating a typical real-time point of sale transaction;

DETAILED DESCRIPTION OF PREFERRED EMBODIMENTS

1. Subaccount System.

First, briefly, the multiple subaccount section of the present invention is directed to a data processing system for managing a plurality of composite accounts for financial cash management, wherein each composite account has a master account and at least one subaccount that allows an individual to establish and manage their (and their household's) complete portfolio of cash assets with one concise, cost effective account. For an individual, this system, described more fully below, has a single master account, with a variety of subaccounts directed to a specific goal such as monthly household expenses, long term investment strategies and other financial goals. The database management system has a central processing unit ("CPU") for information such as name, address and account information for each individual, with a data processing system, known as the Link System to recognize that an account (either a master account or a subaccount) is part of the composite account for the individual, a data processing means for receiving an individuals request on either a real time or periodic basis for the transfer of funds between the linked accounts and means for generating, displaying and outputting reports.

Figure 1:
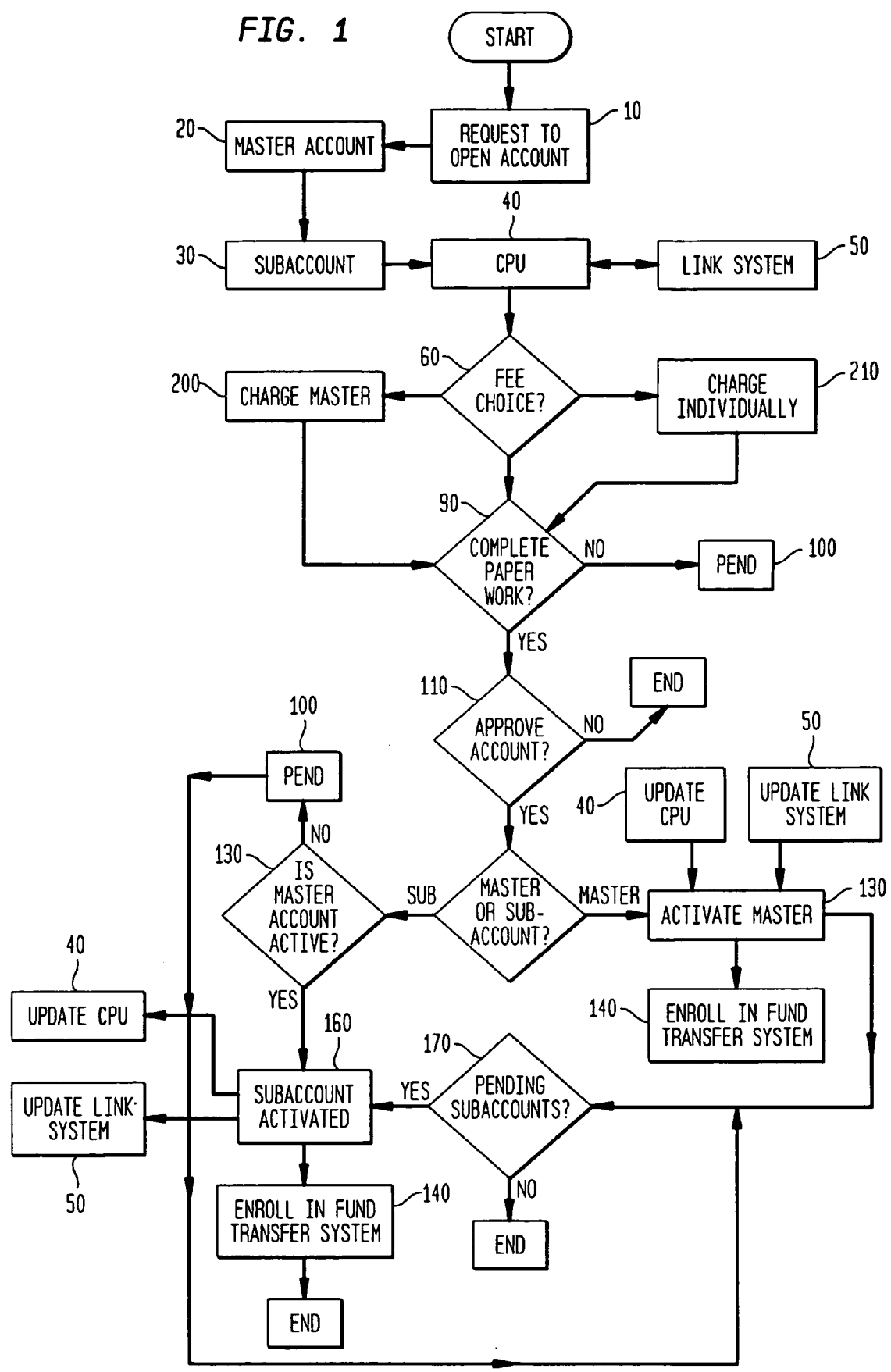
FIG. 1 is a flow chart for the establishment of the composite account with a master and subaccounts in the improved brokerage/cash management linked system.

Referring now to FIG. 1 there is an operational flow chart showing the data processing system for establishment of a brokerage/cash management system in accordance with the invention.

Figure 2:
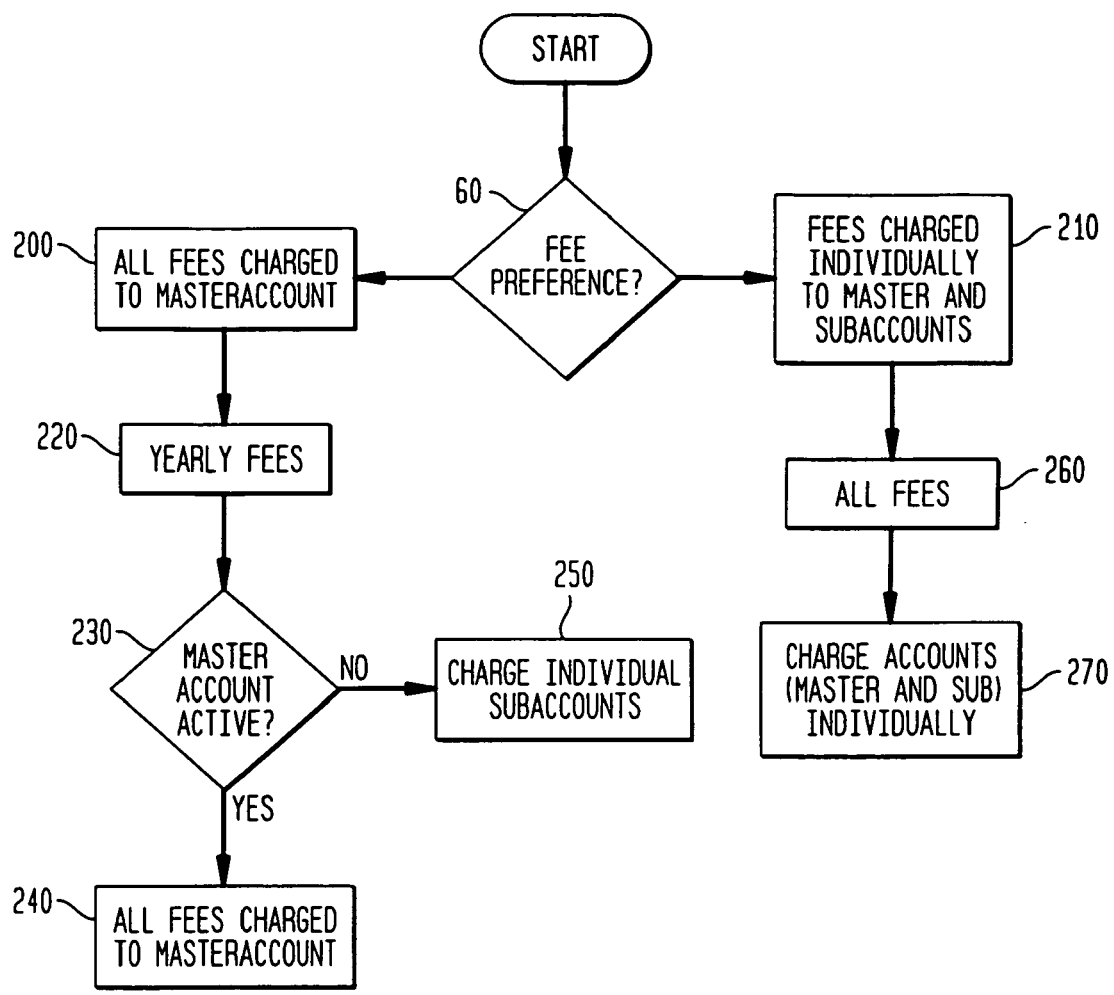
FIG. 2 is a flow chart depicting the establishment of the fee charges for the linked accounts.

Beginning at the top of the FIG. 1, a request is input to the system and received by the system in order to open an account 10. The Master Account 20 and one or more Subaccounts 30 are opened and a Central Processing Unit ("CPU") 40 containing the master database receives the individuals identification such as the name and address of the individual, along with the information for that account such as the master account identification number, the subaccount identification number, and the account asset information. This information will also be transmitted to the data processing unit which will link the accounts (the "Link System") 50. The system optionally will then request that a Fee Preference 60 be selected by the individual for the Master Account 20 and for each of the Subaccount(s) 30 opened. The Fee Preference 60 is illustrated in FIG. 2, discussed below allows fees to be charged either completely to the Master Account 200 or individually to the Master Account and Subaccounts 210.

At this point, the paperwork for the account is reviewed for completeness 90. If the paperwork is not completed, the request will be pending 100 for a set period of time (e.g., 90 days), after which time if the completed paperwork has not been received, the request will lapse. Once the paperwork is completed, then the request will be reviewed for Approval 110 for the Master Account 20 and the Subaccount(s) 30. If it is not approved the request is denied (End). If the account is approved, then the Master Account 20 is Activated 130 and it is then Enrolled in the Fund Transfer System 140. At this time, the CPU 40 containing the master database and the Link System 50 are automatically updated with the information that the Master Account 20 has been activated. The Fund Transfer System 140 will allow the Master Account 20 to transfer funds both internal and external to the system, including transfers to and from any linked subaccount(s).

At this point, the determination will be made whether any Subaccount(s) 30 are pending 170 with respect to the newly activated Master Account 20. If the determination is made that Subaccount(s) 30 are pending 170, then the Subaccount(s) 30 is Activated 160 and Enrolled in the Fund Transfer System 140. For the Subaccounts 30, the Fund Transfer System 140 will allow funds to be transferred internally within the composite account to the linked Master Account 20 or another linked Subaccount 30. At a time after the Master Account 20 is activated, an individual may wish to open other subaccount(s). Each time a request is made to open a Subaccount 30, the CPU 40 and the Link System 50 will receive all individual identification such as the name, address and all account information for the Master Account 20 and for all existing linked subaccounts 30 for the individual. The system will then request that a Fee Preference 60 be selected for the new Subaccount. See discussion of FIG. 2 below.

At this point, the paperwork for the Subaccount created is reviewed for completeness 90. If the paperwork is not completed, the request will be pended 100 for a set period of time (e.g., 90 days), after which time if the completed paperwork has not been received the request will lapse. Once the paperwork is completed, the request will be reviewed for approval 110 for the Subaccount 30; approval can be further automated, by a person, or via a combination thereof. If it is not approved, the request is denied (End). If the account is approved, then a determination will be made as to whether an Activated Master Account 130 has been linked to the new Subaccount 30. If an Activated Master Account 130 is present, then the new Subaccount is activated 160 and Enrolled in the Fund Transfer System 140. For the Subaccounts 30, the Fund Transfer System 140 will allow funds to be transferred internally within the composite account to the linked Master Account 20 or another linked Subaccount 30. At this time, the CPU 40 containing the master database and the Link System 50 are automatically updated with the information that the new Subaccount(s) 30 have been activated. If an activated Master Account 130 is not present, then the request will be Pended 100 for a set period of time (e.g., 90 days), after which time, the account will be upgraded to a Master Account 20. If the subaccount is for another household member, the CPU 40 containing the master database and the Link System 50 will be updated to reflect this information.

Now referring to FIG. 2, once an account has been requested, the Fee Preference 60 for that account must be established. After the account has been requested, the individual will be asked to allot fee charges for the Master Account 20 and all Subaccount(s) 30 either entirely to the Master Account 200 or alternatively individually to the master Account and each of the established Subaccount(s) 210. Since the Subaccounts 30 have limited features with respect to a Master Account, fees applied to the Subaccount(s) will generally be noticeably less.

If the individual chooses to have All Fees charged to a Master Account 200, then all initial fees for Master Account 200 and subsequently for all Subaccount(s) 30 will be charged against the Master Account 200. When it is time for the Yearly Fees 220 for the Master Account and all Subaccounts, the system can check to see if the Master Account is Active 230. If the Master Account is Active 230, then all charges for the Master Account and all Subaccounts will be charged against the Master Account 240. However, if the Master Account is not active, then the individual Subaccounts 250 will be charged on their respective anniversaries. If the individual chooses to have All Fees charged against a Master Account and Subaccount(s) individually 210, then All Fees 260 will be charged against each individual account on its respective anniversary 270. Cost savings will normally be shown if the individual chooses to have All Fees charged against a master account 200 since charges will not accrue on any subaccount until the next anniversary of the master account. Of course, other methods for billing and receiving any recurring management fees for the accounts can be implemented.

For example, if a master account with an annual fee of $100.00 is opened in April 1992 (with its yearly fees charged at that time), and then a linked subaccount with an annual fee of $25.00 is opened in May 1992 and the individual chooses to have all fees charged against the master account, no fees will be charged for the subaccount until April 1993, at which time the master account will be charged $125.00. However, if the subaccount is opened with the individual choosing to have the subaccount fees charged against the subaccount, then in may 1992, $25.00 will be charged and another $25.00 will be charged in May 1993. By May 1993, if the individual chose to have all fees charged against the master account, the total fees incurred would have been a total of $225.00. If the individual chose to have fees charged individually, then by May 1993 the total fees incurred would have been a total of $250.00. This example also illustrates the cost effectiveness of the invention, generally. In the above example, if the composite account was not available, then the individual would have had to establish two separate primary accounts, each having an annual fee of $100.00. Therefore, in April 1992 the individual would have been charged $200.00 and then again in April 1993 the individual would have been charged $200.00 for a total of $400.00 as opposed to the $225.00 or $250.00 in fees incurred in the new system.

As discussed with respect to FIGS. 1 and 2 above, the securities brokerage/cash management system which supervises, implements and coordinates a margin securities brokerage account is constructed of a Master Account and one or more subaccount(s) each having a fee preference option. Once the Master Account and the subaccount(s) are activated, linked and enrolled in the Fund Transfer System each can transfer funds between such linked accounts on a periodic basis, e.g., a weekly basis, and/or on a demand (as needed) basis by the individual. In addition to transferring funds, deposits can be directly made to the Master or any of the Subaccount(s).

Figure 3:
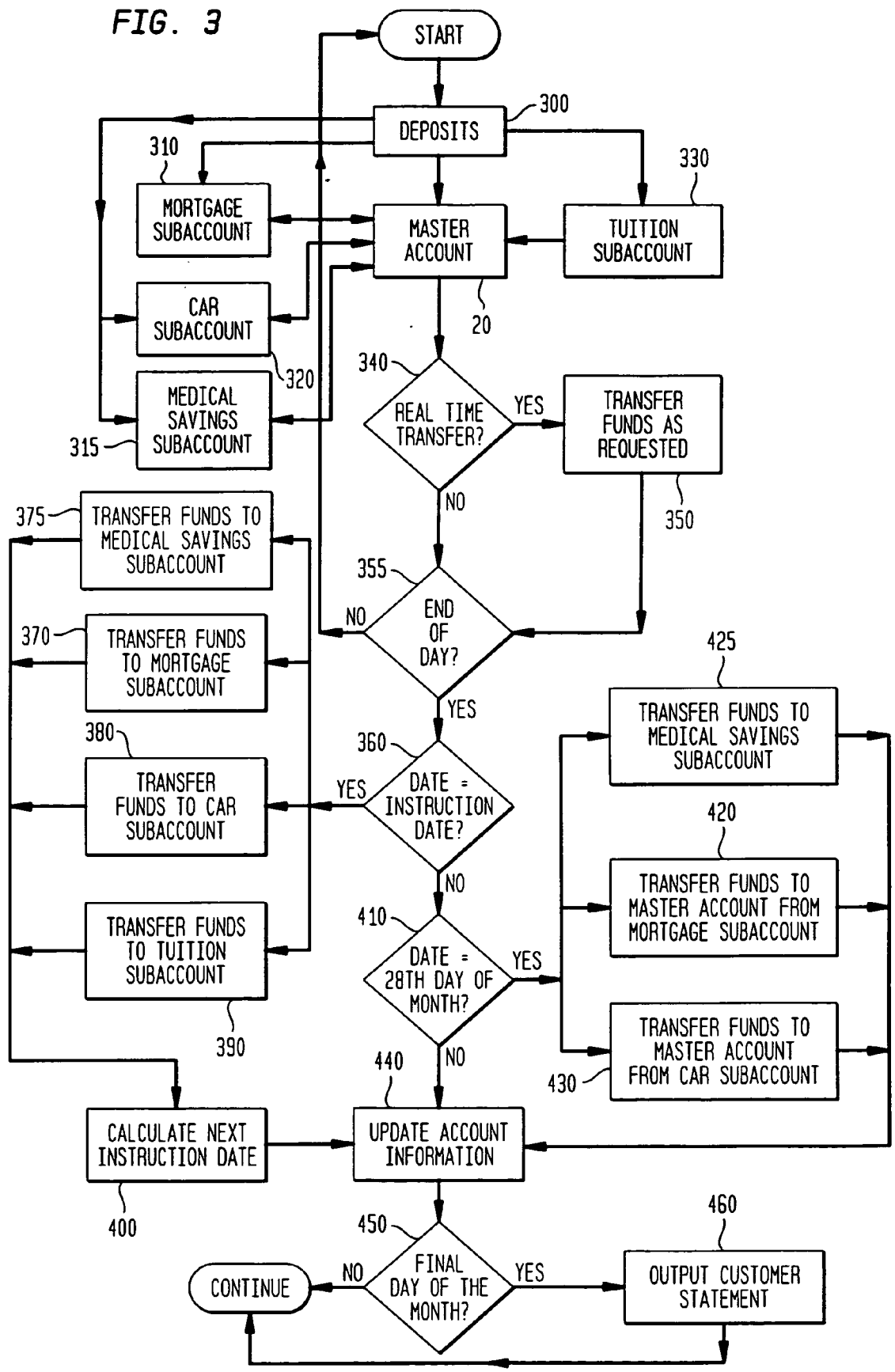
FIG. 3 is the flow chart for a representative account.

FIG. 3 is an illustrative example of an improved securities brokerage/cash management system which supervises, implements and coordinates a margin securities brokerage account having a Master Account 20 and four subaccounts, denoted respectively as Mortgage Subaccount 310, Medical Savings Subaccount (MSA) 315, Car Subaccount 320, and Tuition Subaccount 330. Starting with the Deposit 300, deposits to the composite account can be made to the Master Account 20 or directly to the Mortgage Subaccount 310, Medical Savings Subaccount 315, Tuition Subaccount 330 or Car Subaccount 320. Next, on a continuing basis, the system checks to see if there are any real time transfers 340 (i.e., customers manual request for a transfer) pending, and if there are, the transfer is processed at the time of the request 50. The system will transfer the requested funds from the specified account (e.g., the Tuition Subaccount 330) to the destination account(s) (e.g., the Master Account 20). Clean-up of the system is preferably performed on a regular basis, such as day's end. At the End of the Day 355, that day's periodic transactions are processed, including the transfers between the linked Master Account, MSA, Mortgage, Car and Tuition subaccounts. In this example, the accounts have been set up to have an automatic transfer of funds from the Master Account 20 to the Mortgage Subaccount 310, the MSA 315, the Car Subaccount 320, and the Tuition Subaccount 330 every 14 days and an automatic transfer of funds to the Master Account 20 from the Mortgage Subaccount 310, the MSA subaccount 315, and the Car Subaccount 320 on the 28th day of each month. At the End of the Day 355, the system will check to see if today's (i.e., that day's) Date is the date of next periodic instruction 360; if it is, then the system will transfer a predetermined amount of funds to each the Mortgage Subaccount 370, the MSA subaccount 375, the Car Subaccount 380, and the Tuition Subaccount 390. The system then calculates and sets the date of the next periodic instruction 400. The system also determines whether the date is the 28th day of the month 410. If the Date is the 28th day of the month 410, then the system transfers a predetermined amount of funds to the Master Account from the Mortgage Subaccount 420, the MSA subaccount 425, and from the Car Subaccount 430. In this example, an individual does not have the subset ability to write checks directly from the subaccounts, therefore the individual can periodically transfer money to the Master Account for payments.

After the system has completed each transfer described above, it will appropriately update the Account Information 440 for the Composite Master Account 20 and Linked Subaccounts 30. If it is the Final Day of the month 450, the system will generate a concise customer statement 460 of the month's activities for the composite account including the Master Account 20 and preferably for each of the linked Subaccounts 30 for each individual.

Figure 4:
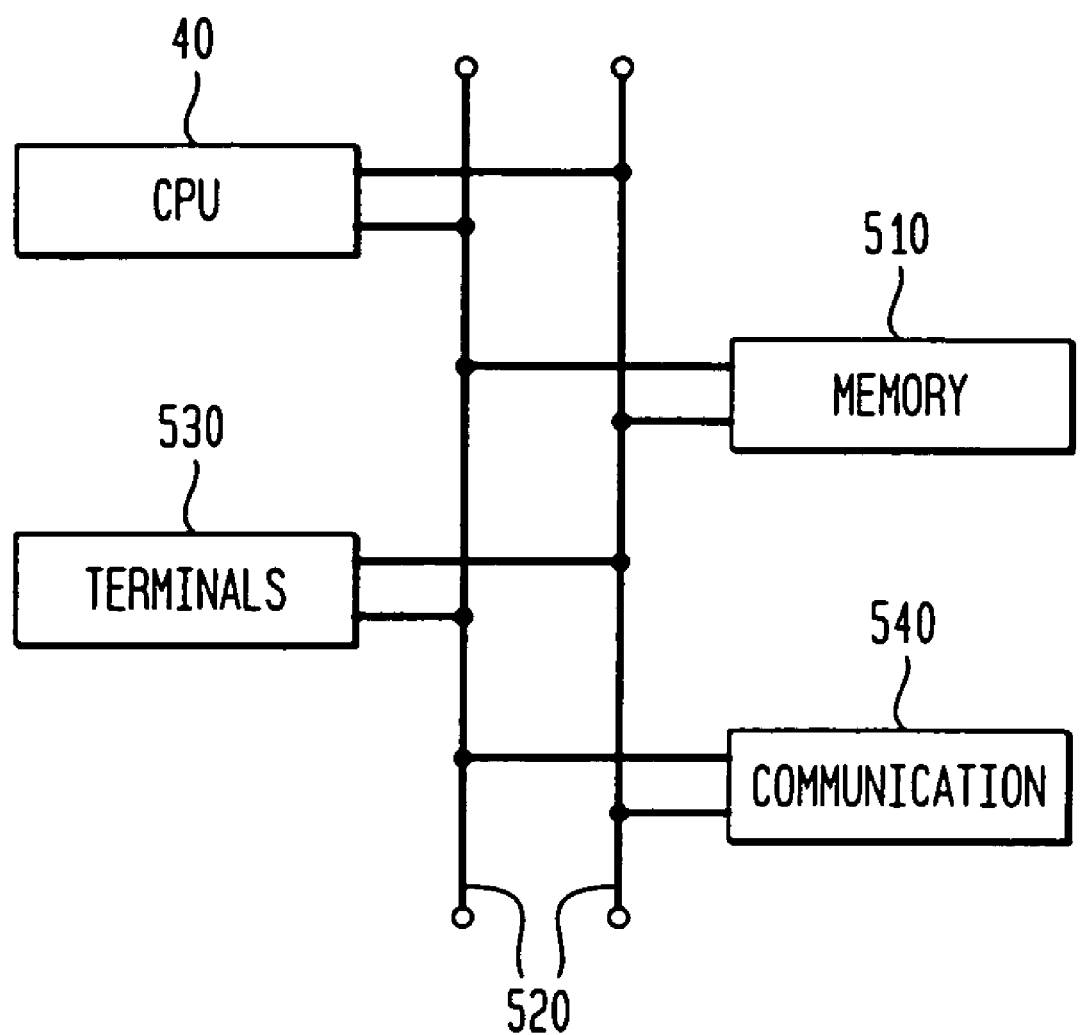
FIG. 4 depicts the operative elements in block diagram form for the present invention.

Attention is now directed to FIG. 4 wherein hardware elements of the present invention are briefly described. In this context, the selected hardware platform is not particularly limiting and will be dictated by the number and activity of accounts under management. In particular, the Central Processing Unit ("CPU") 40 containing the system database and which implements the system commands is connected to memory unit 510 via address and data buses 520 for update and access to system records such as account assets. Additionally, support exists for terminal control 530 to allow multiple access and input to data and output to data, along with communication management 540 for communication exchange with the systems shown in FIG. 1.

The above-described composite account arrangement has thus been shown to provide an improved securities brokerage/cash management system which supervises and integrates a brokerage account in which a Master Account with one or more linked subaccounts is used to manage an individuals funds which accounts (master and subaccounts) can transfer funds to and from, providing greater flexibility for the individual, while providing earned income for funds not invested or required to satisfy expenditures.

2. MSA Subaccount System

Figure 5:
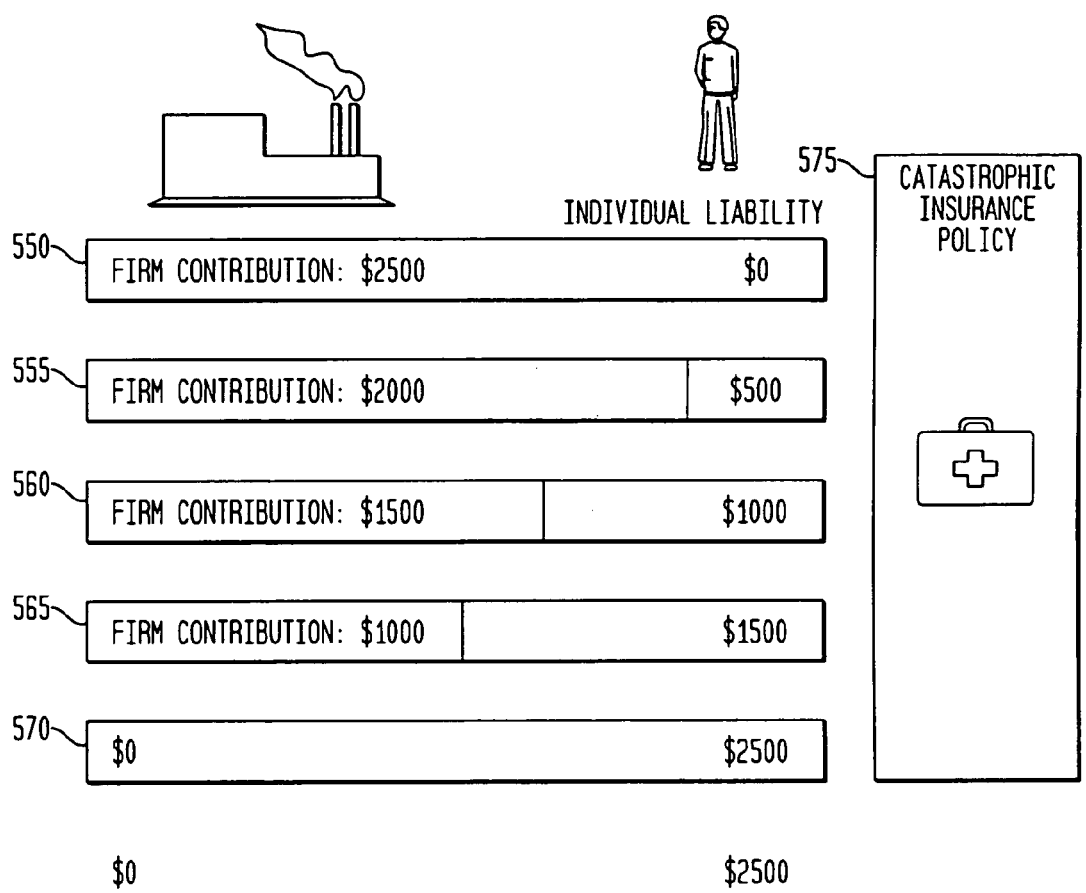
FIG. 5 is a diagram illustrating various funding methods for an MSA.

One particularly important example of using a subaccount is where there subaccount is a Medical Savings Account, MSA, used to pay medical expenses. Preferably, a plurality of MSAs are managed by the present system, at least one of the MSAs being a subaccount linked to a master account as described above, although only one MSA can exist per social security number. MSAs are an alternative to comprehensive health insurance. The coupling of an MSA with a high-deductible insurance policy provides first dollar coverage of health care expenses and minimizes administrative costs. An MSA is established by funding an account which is used for the direct payment of health-related expenses. Account holders may pay medical expenses tax-free from the account by using an MSA debit card or checks, or leave their funds invested on order to grow tax deferred. The remaining funds pay all expenses up to the deductible. All covered health care services above the deductible are paid by the catastrophic insurance. The money for the MSA may come from the subscriber's employer, a professional association to which the account-holder belongs, or from the subscriber himself (as is the case in individual accounts). FIG. 5 illustrates several funding examples for an MSA established with $2500, an amount corresponding to the deductible of the catastrophic insurance policy 575. In example 550, the employer contributes the entire $2500. In examples 550, 560, and 565, the employer contributes lesser amounts, with the difference made up by employee payroll contributions. In example 570, the individual account, the subscriber funds the entire $2500. The $2500 may be pre-funded at the beginning of a plan year or periodic contributions may be made during the year, either by FTS (Funds Transfer Service), Direct Deposit, or payroll deductions. These electronic transfer methods allow easy transfer of funds from an accountholder's Master Account or other subaccounts. It should be understood that existing legislation may not allow all funding variations shown and/or described herein, but the system is described as capable of including such funding protocols.

Once an MSA is established, it is portable to cover the subscriber even after separation from an employer. Since the funding percentages established in FIG. 5 can be changed at any time, a subscriber may keep her MSA in force by making all future contributions. It is well known in the insurance industry that the vast majority of participants will spend less than the above amounts on individual health care. The remaining funds belong to the subscriber and may be left to accumulate to protect against job loss or transfer or may be moved to other long-term investments in accordance with IRS regulations.

This allows the account holder to potentially supplement their retirement savings with any funds not used for medical expenses. In the following discussion, it should be remembered that the MSA account discussed below is actually a specific subaccount designated for eligible individuals of the aforedescribed system.

Figure 6:
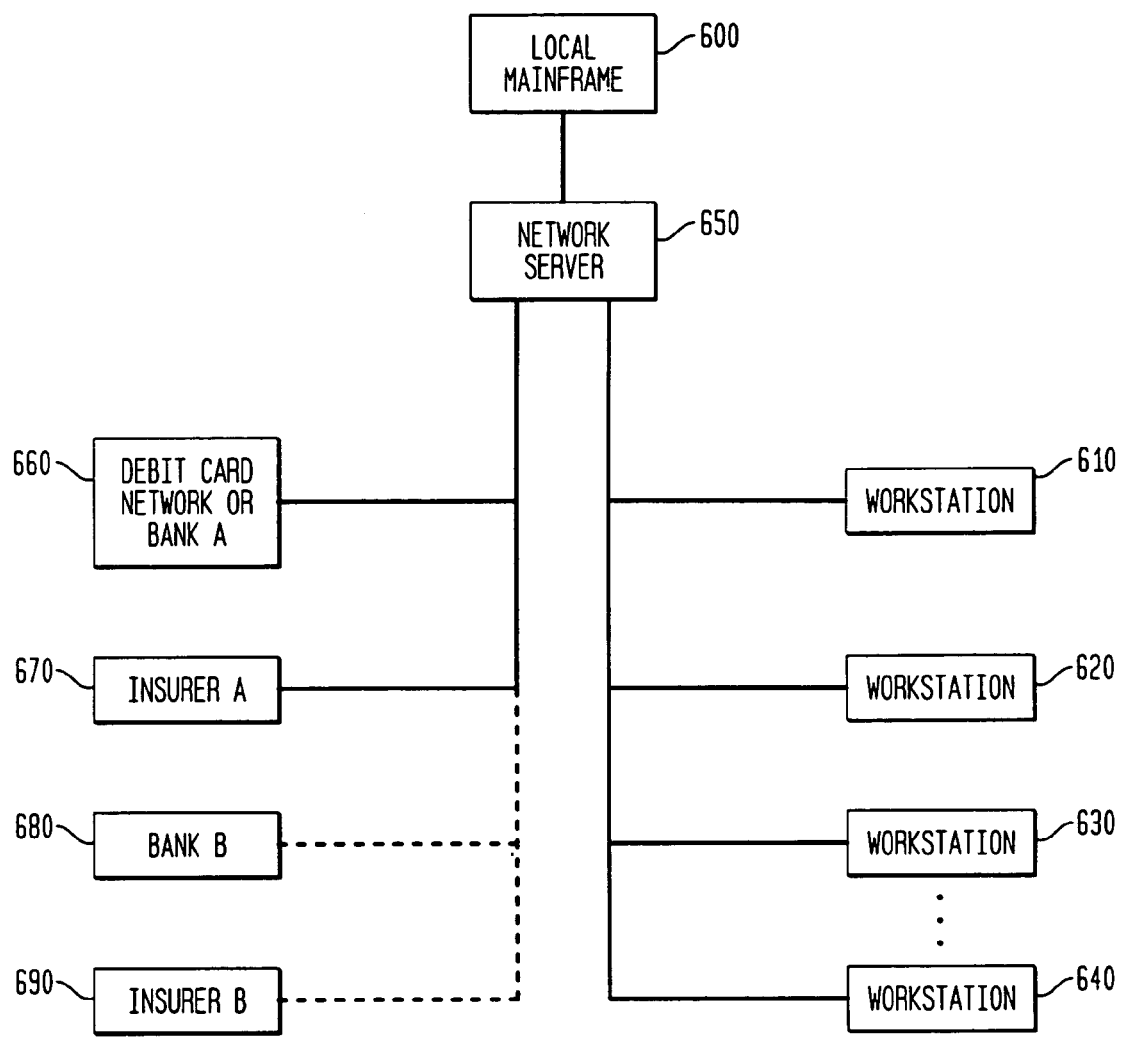
FIG. 6 is a block diagram of the hardware arrangement of the invention.

Attention is first directed to FIG. 6, wherein the data processing system and its communicative arrangement is presented. The data processing system of the present invention resides on local mainframe computer 600. Computer 600 may be any type of general purpose computer having suitable storage facilities for the database of the invention. Computer 600 is coupled to network server 650 which forms the central hub of a real-time communications network. Connected to this network are a plurality of workstations. Although four workstations are illustrated for example, the actual number is limited only by the hardware capacity of the network. These workstations are used for real-time access to the MSA database, as for example by data entry or customer service personnel. Portions of the data processing system may reside on the individual workstations. Also connected to network server 650 is a link to an insurer 670 for real-time data exchange between the financial service institution ("the administrator") and the insurer providing the catastrophic insurance coverage. Additional links, such as 690, are possible for multiple insurance providers. Data link 660 (and additional links such as 680) is provided for communication between the administrator and a third party network providing debit card services. Examples of such service providers are VISA, Mastercard, American Express, and numerous banking institutions having debit cards. This link is the primary data input facility for claim submission to the MSA account. A debit card swiped through a point-of-sale terminal at a health provider's location initiates a temporary connection through the debit card network to submit a claim to the administrator's computer 600. As in a typical debit card transaction, various data, such as account number, date, provider identity, and amount of sale, are transmitted to computer 600. In some cases, this data may also include extended coding to identify specific charges or types of service (i.e., a medical CPT code) and/or a diagnosis. In response, the administrator's computer returns a code approving or denying the transaction, upon which the connection is terminated.

Figure 7:
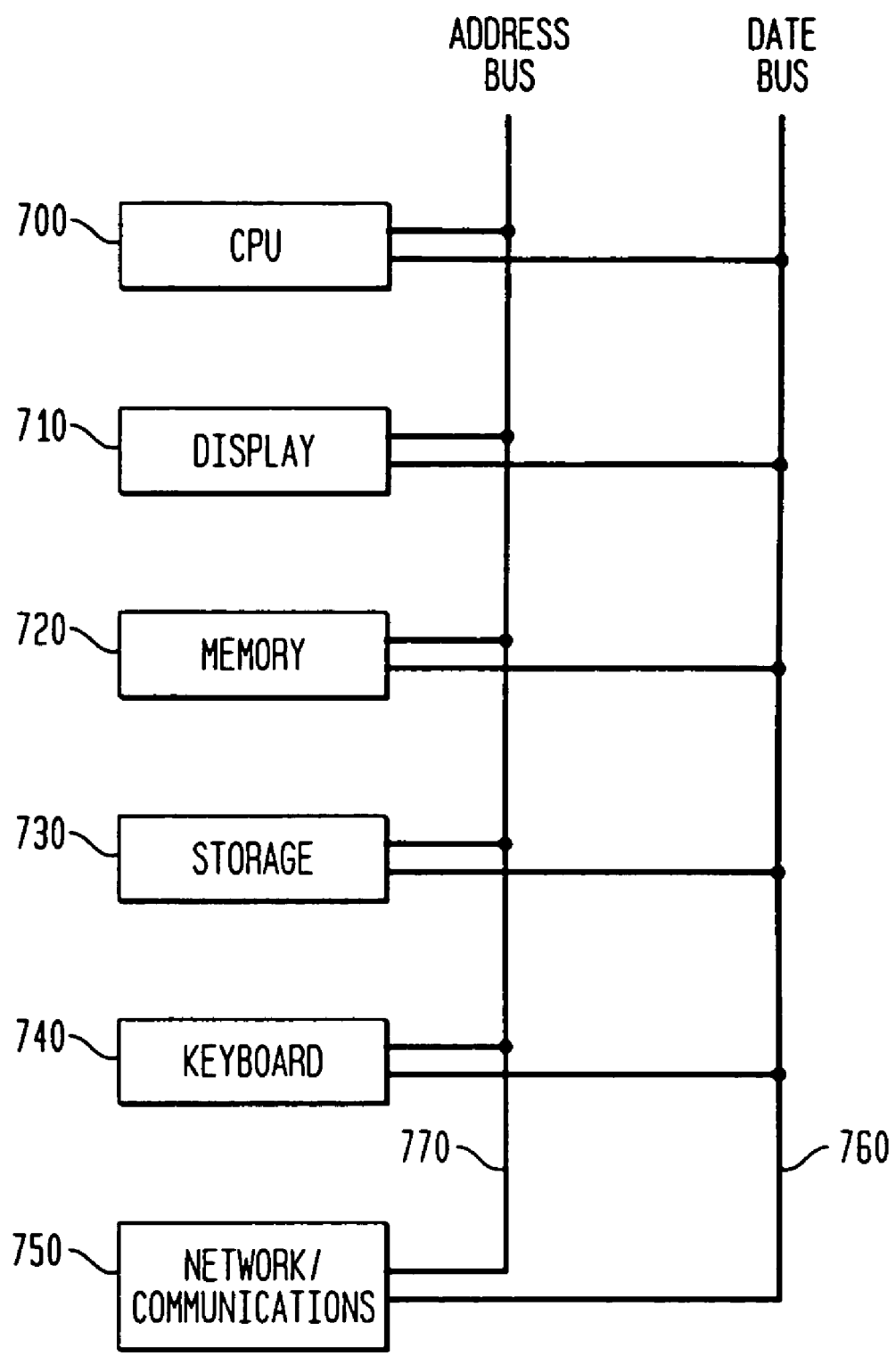
FIG. 7 is a block diagram of a typical workstation shown in FIG. 2.

Briefly referring to FIG. 7, the architectural hardware arrangement of each workstation of FIG. 6 is shown in greater detail. The workstations may consist of a general purpose or personal computer or any other terminal equipment having a local CPU 700, display 710, memory 720, storage medium 730 and keyboard 740. These components interact via data bus 760 and address bus 770 and are further coupled to network/communications interface 750 for connection to the network server 650 of FIG. 6.

System operation is software controlled on a real-time or periodic basis to create accounts for new subscribers, update the database and process individual transactions. The software operates on hardware facilities as described above or on any comparable conventional hardware system. The logic flow for controlling system operation is depicted in the flow diagrams described below.

The database of the invention maintains a plurality of files corresponding to the individual subscribers. Each subscriber's file contains, in addition to transactional data, a series of descriptive parameters controlling his account. Table 1 below lists several example parameters which may be recorded. Basic information, such as subscriber's name, address, dependents and indication of whether the account is individual or employer-sponsored, is maintained for all accounts. Additional parameters which may be used include an employer or group affiliation number to identify a class of account that a subscriber is a member of; the deductible, DEDUCT(I), which applies to the associated catastrophic health insurance policy; the annual premium, ANN-PREM (I), for this policy; and the periodic due dates or number of cycles for premium contributions, PREM-DUE(I). Additional parameters record the subscriber's bank and account numbers for direct deposit or Funds Transfers Service funding of the MSA; the respective percentages of funding by an employer or employee; and the due dates of these contributions, PERIOD(I). Further optional parameters, whose use will be described later, include such items as a debit card float or loan limit, ACCT-LIMIT(I) Calculator, and parameters to allow a subscriber to skip a periodic contribution or make an extra payment. Other parameters may be added to the database to realize the desired processing control for particular or groups of accounts.

TABLE 1

Subscriber's Name
Address
Dependents
Corporate/Individual MSA
Employee/Group Affiliation Number
Health Insurance Deductible    DEDUCT(I)
Periodic Contribution Cycles/Year    PERIOD(I)
Annual Health Insurance Premium    ANN-PREM(I)
Premium Payments/Year    PREM_DUE(I)

TABLE 1-continued

Account for Direct Access corporation
employee (subscriber)
Employer Funding Percentage
Subscriber Funding Percentage
Debit Card Float Limit     ACCT_LIMIT(I)
Skip Payment     SKIP_PAYMENT(I)
Extra Payment     EX_PAY(I)

Figure 8A:
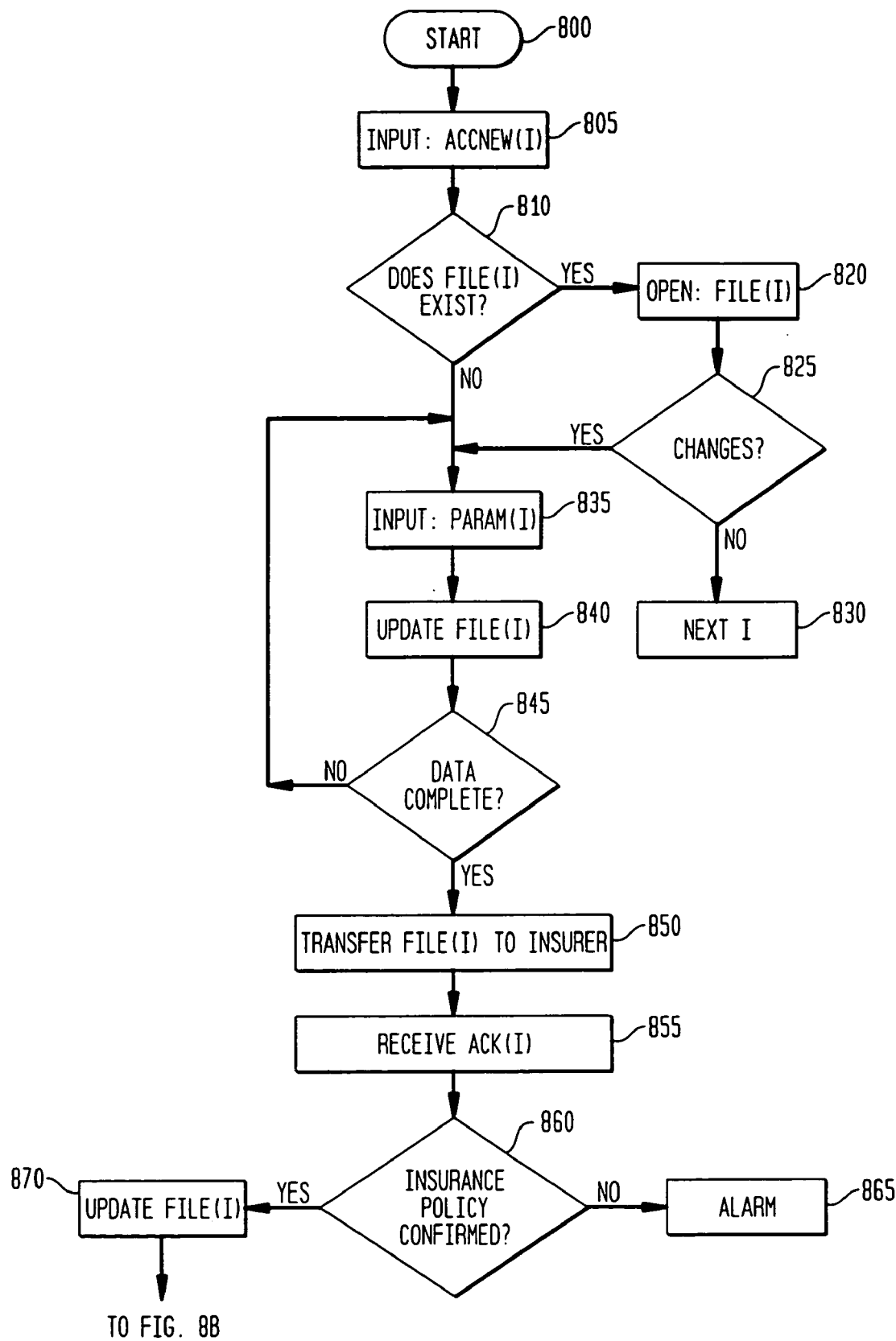
FIGS. 8A–8B are a logic flow diagram of an account set-up and maintenance routine in accordance with the invention.

Referring to FIG. 8A, the logic flow for creating and updating individual accounts is presented. The logic starts conceptually at block 800 and proceeds to block 805 where the name of the desired account is input via a workstation, a batch file of new accounts or other input means. The requested file is assigned an index number (I) for all subsequent processing. At test 810 a determination is made if the identified account already exists. If it does, processing continues along the "YES" path to block 820 where the existing account file is opened or retrieved from storage. At test 825 it is determined as to whether it is desired to make any changes. If "NO," processing for this account conceptually ends at block 830. If "YES," or if the requested account does not yet exist, processing proceeds to block 390, where the particular parameter to be entered, or modified in an existing account, is input. The subscriber's account file is established or updated at block 840 with the new parameter data 835. Test 845 allows iteration of this step to input/update any parameters maintained in the subscriber's account. These parameters may, for example, be those listed above in Table 1 and briefly described above.

In the above fashion, it is simple for a subscriber to control his account. She may, for example, call a customer service representative by telephone, and instruct the representative to update his account (e.g., a new address or dependent). The representative enters these changes at his workstation (e.g., 610 in FIG. 6). Alternatively, provision may be made for a user to make these changes remotely using his personal computer. The subscriber may also issue instructions so that he does not have to make a particular contribution due for the current period, or to authorize an extra contribution. This would be processed by setting the parameter SKIP_PAYMENT(I) to TRUE, or EX_PAY(I) to the desired dollar amount of the extra payment.

Once the account is completely updated ("YES" to test 845) processing continues to block 850 where the file for this subscriber is transferred to the associated insurer. In this manner, the subscriber is not burdened with an extra administrative task yet the insurance company receives up-to-date status of a subscriber's account. Alternatively, these transfers may be performed in batch for a large group of accounts having the same insurer. The insurer (preferably) calculates the permitted contribution amount for that particular subscriber 855 from the data file was successfully transferred; the system determines at test 860 whether or not the insurer confirmed issuance of a catastrophic policy for this subscriber. If "NO," an appropriate alarm is generated in block 865, such as notifying an account representative or generating a letter to the subscriber. If "YES," the account is updated at block 870 to reflect that a valid policy is in effect.

Figure 8B:
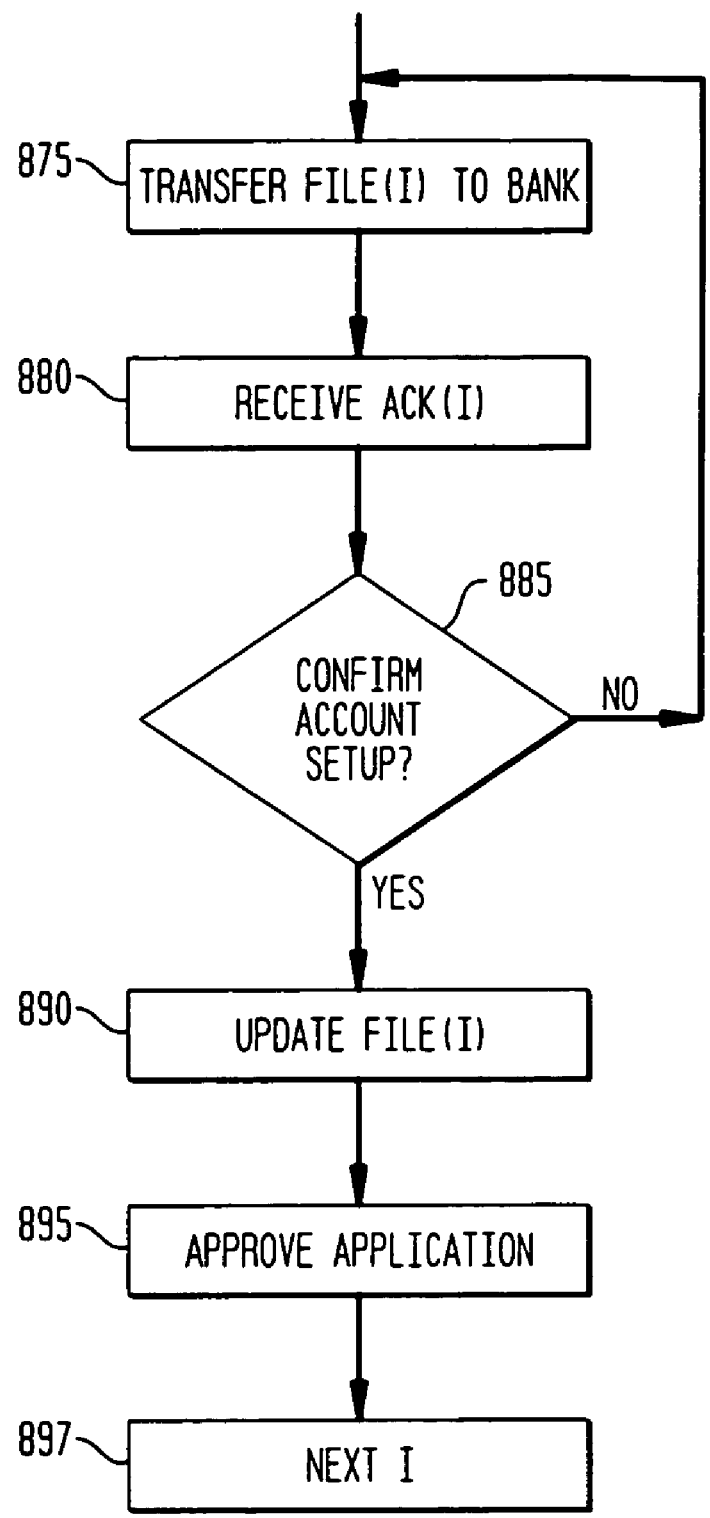

Processing then continues with FIG. 8B, to block 875 where the file transfer routine is repeated for the bank or debit card issuer to ensure that a valid debit card is issued to the account holder by receiving an acknowledgement 880. Once this set-up is confirmed (test 885) and recorded (block 890), block 895 finalizes the account set-up routine, such as by generating a welcome letter to the new subscriber or mailing him useful MSA literature or account rules. Set-up processing for this account ends at block 897 and proceeds back to block 805 (FIG. 8A) to process the next new account.

Figure 9A:
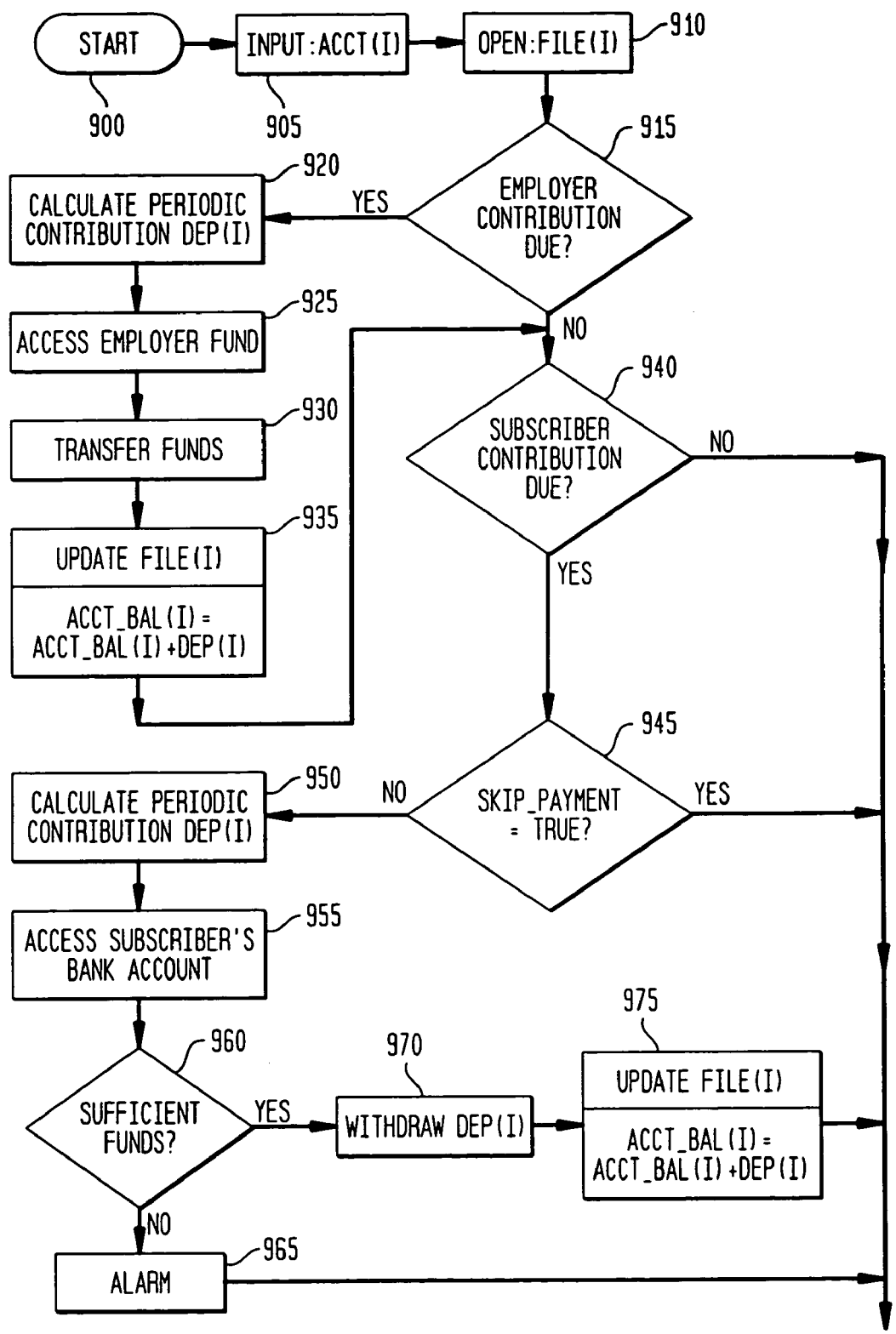
FIGS. 9A–9C are a logic flow diagram of a periodic database maintenance routine in accordance with the invention.

Referring now to FIG. 9A, a periodic account maintenance routine is described. This routine may be run daily, monthly, or at any other appropriate interval. Proceeding from block 900, processing begins by identifying at block 905 an account to service, designated by the index number (I). At block 910, the identified account file is accessed from the database. Processing continues through a series of events which must occur periodically in each account. For example, at test 915 it is decided if a contribution is due to the subscriber's MSA from an employer. This is accomplished by checking the previously established parameters in the subscriber's account, such as whether this is a corporate sponsored account, and the parameters PERIOD(I) and employer funding percent (%). If no contribution is due, processing follows the "NO" path to the next test 940. If a contribution is determined to be due, a sub-process starting at block 920 is executed. In block 920 the amount of the periodic contribution, DEP(I), is calculated. This calculation figures the funds needed in the MSA and for the health insurance premiums for the remainder of the year and divides this amount over the number of remaining cycles in the year, then prorates that amount by the employer's contribution.

At 925, connection is made via the network to the employer's bank account identified in the parameters table and funds equivalent to DEP(I) are transferred to the subscriber's MSA. This transaction is recorded at block 935 by incrementing the account balance, ACCT_BAL(I), by the corresponding amount, DEP(I). Alternatively, if a large number of MSAs exist for a single employer, as can be identified by the parameter "group affiliation number," the actual funds transfer may be accumulated and done as one transaction.

Figure 9B:
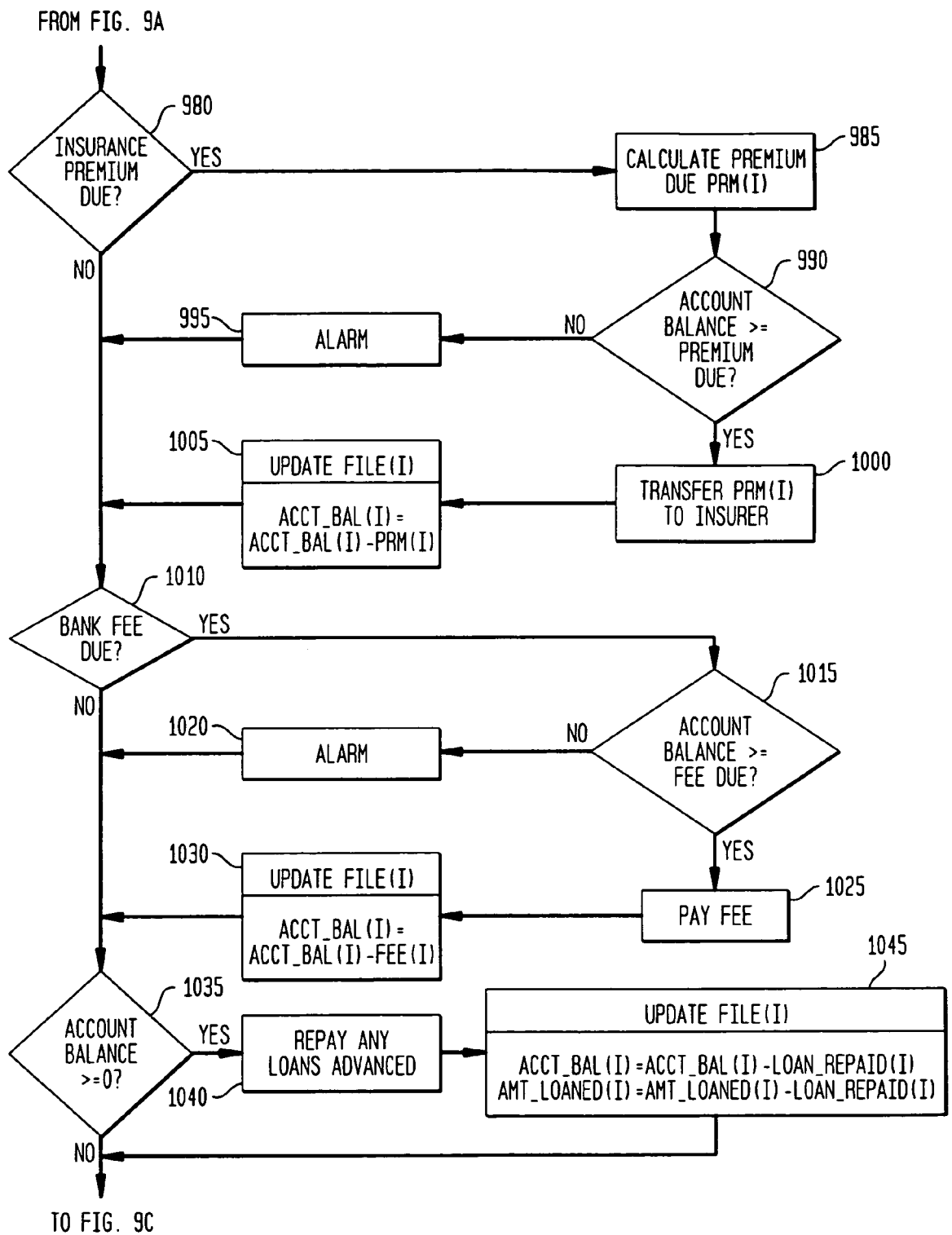

Periodic processing continues to test 940, where it is decided if a contribution to the MSA is due from the subscriber. Again, if "NO," processing continues on to the next test 980 (FIG. 9B). If "YES," another sub-process begins at step 945. Here, the rest of the sub-process is skipped if at any time during the current cycle, the subscriber issued instructions to skip this period's contribution (e.g., set SKIP-PAYMENT(I)=TRUE). This option is provided as a service to the subscriber to forego his periodic contribution in a cycle in which he is short on funds. If he has not issued such an instruction, the sub-process continues to block 950 where the amount of the contribution due, DEP(I), is calculated in a fashion similar to step 920 for the employer. However, DEP(I) also includes the amount EX-PAY(I) so that a subscriber may make extra contributions in any cycle when he has excess funds or to make up a previously skipped payment. In any event, the subscriber has full control to alter his periodic contribution schedule as needed, and the periodic contribution is automatically adjusted for all future periods. At block 955, the subscriber's bank account identified by his account parameters is accessed through the network described in connection with FIG. 6. Test 960 determines if sufficient funds are available in the bank account. If "NO," a suitable alarm is generated at block 965, such as generating an invoice to the subscriber. Alternatively, funds to cover the shortfall may be transferred from the subscriber's long-term savings account, which will be described later. If the funds are available, block 970 makes the funds transfer and block 975 updates the subscriber's account balance by this amount. Again, if desired, individual transfers may be accumulated during batch processing, segregated and totalled by common banks, whereupon a single funds transfer is executed for each bank. Referring next to FIG. 9B, processing continues to test 980 where it is determined if premiums are due to the insurer. If "YES," block 985 calculates the premium due, PRM(I). Test 990 determines if the subscriber's MSA has a sufficient balance to pay this premium and if "YES," block 1000 transfers the premium due to the insurer and block 1005 deducts this amount from the MSA balance. If an insurance premium is due before sufficient periodic contributions have been made to the account, or if numerous claims have been made on the MSA, it is possible that the MSA account balance will be insufficient to cover the insurance premium due. In this event, alarm block 995 executes to remedy the situation, such as by generating an invoice to the subscriber, or possibly loaning the shortfall to the subscriber or again, transferring the funds needed from long-term savings. This situation should be avoided by proper settings of the account parameters so that contributions are made in sufficient time to cover premiums due.

Continuing in FIG. 9B, test 1010 determines if a fee is due to the bank or debit card company. If "YES," a similar sub-process pays the fee if sufficient funds are available in the MSA. This type of test can be repeated for any other account charges or fees that may be imposed, such as a fee by the administrator for handling the MSA. Next, test 1035 determines if there is a positive balance left in the MSA after all other deductions and deposits have been made. If "YES", block 1040 automatically repays any funds that the administrator loaned to the subscriber to cover account shortfalls in the various described situations. This step may alternatively return funds borrowed from long-term savings. Block 1045 updates the MSA balance to reflect this transaction and appropriately adjusts the loaned balance amount, AMT-LOANED(I).

Figure 9C:
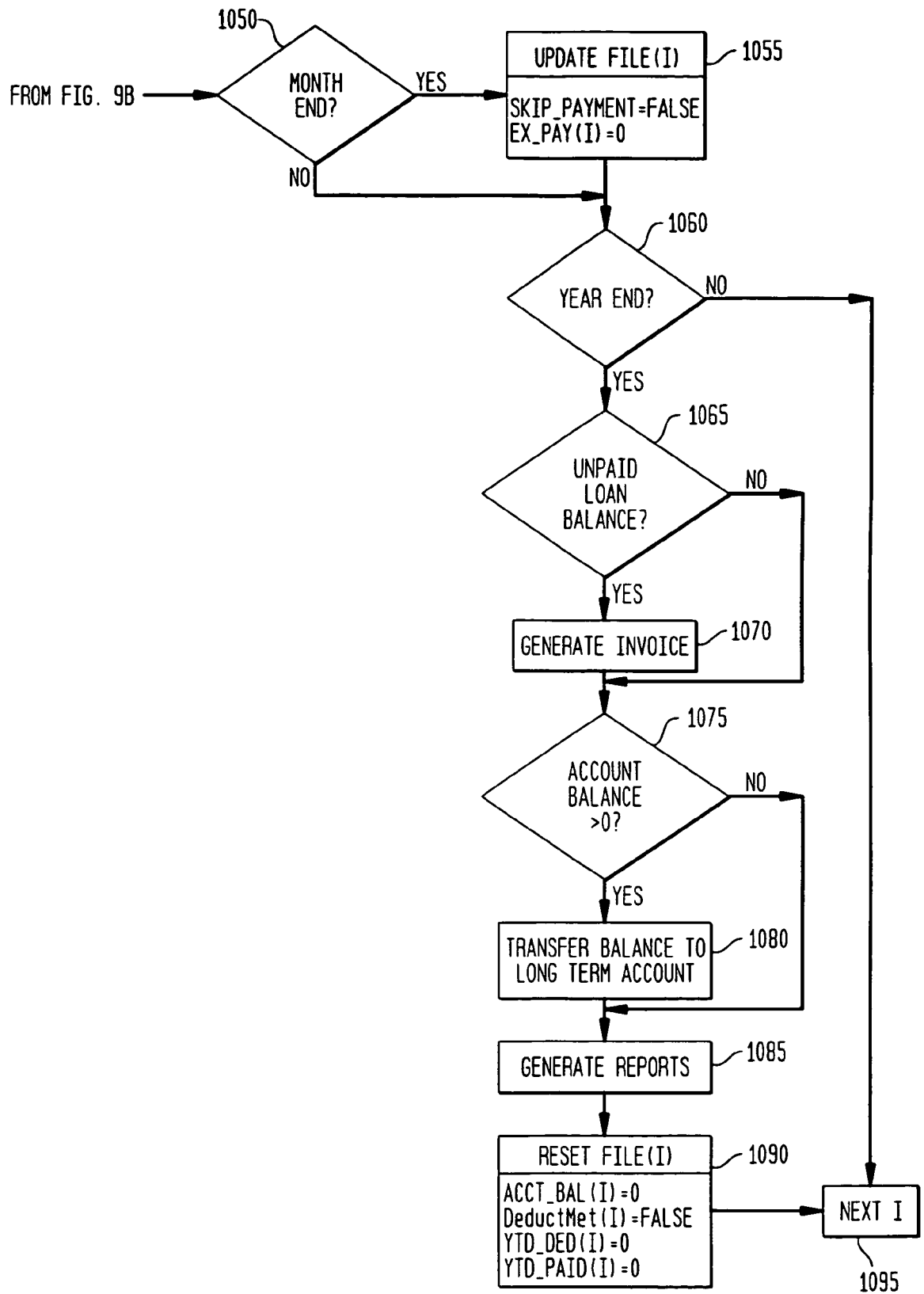

It is noted that any other type of periodic transaction can be added to this processing routine by inserting a sub-process in the chain of test steps 915, 940, 980, 1010, 1035. After these sub-processes complete, test 1050 (FIG. 9C) decides if a cycle period has passed. For example, this account maintenance process may execute daily for all accounts, but the next sub-process only executes monthly. If the period end has occurred, certain account variables are reset. For example, SKIP-PAYMENT(I) is set back to FALSE and EX-PAY(I) is reset to 0.

At test 1060, it is decided whether a set of year-end sub-processes need to be run. If "NO," processing for account (I) conceptually ends at block 1095. If "YES," test 1065 determines if there is any outstanding loan balance that did not get repaid due to insufficient account balance in the MSA. If so, block 1070 generates an invoice for the outstanding balance, or can alternatively take the funds from long-term savings.

As the inspiration for the MSA to effect health care cost reduction, it was stated that the subscriber may keep any unexpended funds in his MSA. Test 1075 in FIG. 9C determines if there are such funds, and block 1080 automatically sweeps these funds into a long-term investment vehicle, such as a money market or any other investment account offered by the administrator, in accordance with the subscriber's pre-authorized instructions. IN this way, the subscriber's liquid assets are consistently invested in an investment vehicle that meets the client's risk tolerance model. It is this sweep and automatic investment feature which calculates the number shares an account holders available assets may buy in the investments available in the sweep which distinguishes the MSA subaccount from a purely transitional account. Block 1085 generates year-end reports, such as form 1099-MSA and form 549B-MSA as well as others that may be required for IRS reporting, or to print a list for the subscriber of all claim transactions for the year. Processing continues to block 1090 where account parameters and variables are reset to begin another year. Processing for account (I) is complete at block 1095 and proceeds back to block 905 (FIG. 9A) to process the next account.

Referring now to FIG. 10, a claims processing routine is presented, starting conceptually at block 1100. In step 1105, the system receives a request to pay a claim. This request is given an index number (I) for reference in further processing. In the preferred embodiment of the invention, the incoming claim request, CLAIM(I), is processed in real-time upon receipt of a transaction from a debit card network. An MSA subscriber, when receiving medical services or products, swipes his MSA debit card through a point-of-sale terminal. The terminal temporarily connects to the debit card network and in turn to the administrator providing the MSA. Data pertaining to the claim is submitted to the administrator which responds with claim approval or denial from the MSA funds. In alternative embodiments, claim requests can be received as paper claims (i.e., traditional medical claim forms) either directly or through a clearinghouse. These paper claims are then entered electronically by data entry operators, either by the administrator or the clearinghouse, and submitted to the claim processing routine as above.

Upon receipt of request CLAIM(I), block 1110 retrieves the file of the corresponding MSA subscriber. Processing of the claim continues to test 1115 which determines whether the maximum annual amount of the MSA has previously been paid from this account. If "YES," CLAIM(I) is denied by block 1120 and processing for this claim request ends conceptually at block 1160. If "NO," test 1125 verifies whether the current claim request is for an amount greater than the maximum remaining MSA funds—in other words, the maximum MSA amount minus the year-to-date already paid out. If "YES," current request CLAIM(I) is reduced in block 1130 to the maximum remaining MSA amount. As an example, assume a subscriber's MSA is funded annually with $2500, of which $2300 has been expended this year on previous claims. If CLAIM(I) is for $400, test 1115 will return a "NO" and test 1125 will return a "YES." Block 1130, in this example, reduces CLAIM(I) from $400 to $200, the maximum remaining MSA funds ($2500 to $2300). These steps provide that the MSA account cannot be overdrawn.

Test 1135 determines if there are sufficient funds currently in the MSA to pay CLAIM(I). There may not be in the case of an MSA, funded by periodic contributions (e.g., monthly), which incurs heavy claims activity early in the year. Test block 1145 decides whether the administrator is willing to loan funds to the subscriber to cover the claim. This decision may, for example, be based on account parameters (e.g., ACCT-LIMIT(I)), previous account history, or based on rules pertaining to a subscriber's group plan. The parameter, ACCT-LIMIT(I), is set to the maximum amount the administrator is willing to advance to a subscriber in circumstances where his account balance is insufficient for a desired transaction. The amount should be set based on the circumstances of an individual account, limited to a maximum of the entire year's MSA funding (e.g., $2500), in the case, perhaps, where it is a corporate-sponsored MSA and the administrator is guaranteed that all funds will be deposited by the employer. Alternately, in the case of a shared contribution plan, ACCT-LIMIT(I) may be set to only the employer's contribution. In the case of an individual account, the administrator may choose to set the loan limit to zero, whereby test 1145 will always follow the "NO" path.

If the decision is made not to advance funds to cover the claim, block 1150 reduces the claim request to the amount of funds currently available in the subscriber's MSA. After making any of the above claim adjustments applicable, block 1140 authorizes payment of the claim. Block 1155 updates the MSA's status by decreasing the account balance by the amount of the claim just paid; increasing a variable, YTD-PAID(I), which keeps track of the total of claims paid out for the year (used by test 1115); and updating a variable, AMT_LOANED(I), by the amount of any funds advanced by test block 1145. Processing for this claim request ends at block 1160, whereupon processing returns to block 1105 to receive the next claim.

Figure 11:
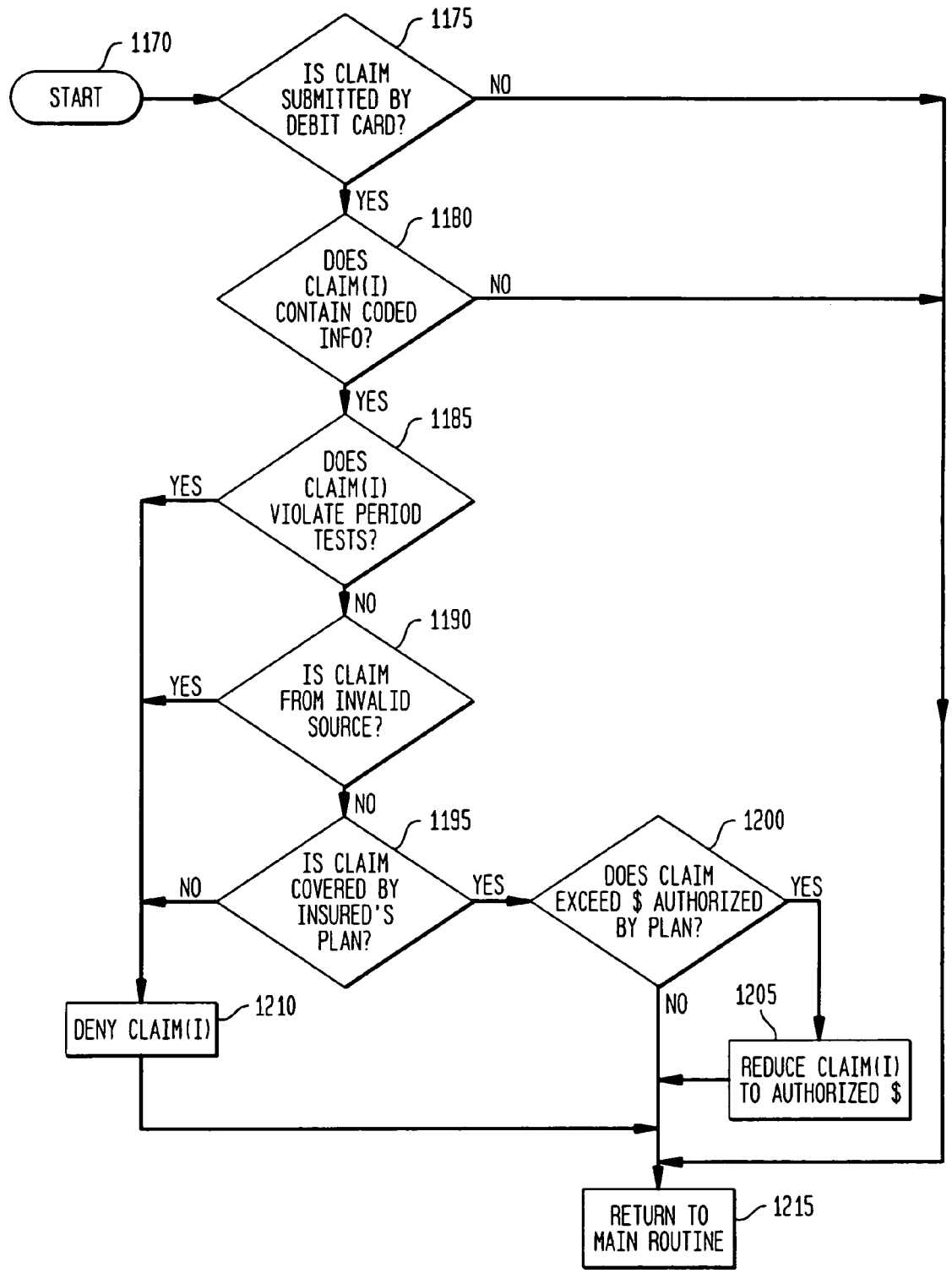
FIG. 11 is a logic flow diagram of additional real-time transaction processing.

As described previously, claims submitted electronically via a debit card may include extended coded information containing a description of the type of service provided and/or a diagnosis. If this data is transmitted with a claim, additional levels of testing are possible to determine whether or not to pay a claim, in addition to the funds availability checks performed in FIG. 10. Tests of this kind may, for example, be performed after block 1110 (FIG. 10). Referring to FIG. 11, several examples of this kind of testing are illustrated. Test 1170 checks if the claim is submitted electronically by debit card and test 1175 determines whether the extended coded information is included. If "NO" to either test, step 1215 returns processing to the standard routine (FIG. 10). Otherwise, testing continues to block 1180, where CLAIM(I) is evaluated for a determination if it violates any periodicity limitations in block 1185. For example, if a particular plan allows for an annual physical, if the code for a physical examination is received a second or subsequent time within the plan year, the claim would be denied in block 1210. Continuing to test 1190, the source of the claims is evaluated. In this test a claim could be denied if it is submitted from a disallowed source under the rules of the subscriber's group. For example, traditional HMO coverage could be incorporated into an MSA plan. Only claims submitted from HMO participating providers would be authorized. If desired, this level of testing could be used to prevent withdrawal of MSA funds for non-medically related purposes (e.g., claim denied if submitted by a car dealer). This procedure can also be used for security purposes (e.g., to look for unauthorized account activity). It is generally known in the debit card industry that stolen credit cards are used highly at particular establishments; claims from such sources can be denied or limited to a certain amount. Proceeding to test block 1195, analysis of claim eligibility under a particular subscriber's group can be undertaken. For example, a claim submitted for a certain diagnostic test, dental work or a prescription can be compared to account parameters for the MSA to determine if such claims are allowed under the subscriber's MSA. If not, processing again diverts to block 1210 for denial of the pending claim.

Test 1200 can similarly test if a particular procedure has an applicable authorized maximum charge. If so, block 1205 reduces CLAIM(I) to that amount. Claim processing continues as in FIG. 10 if not denied by any of these tests. It should be understood by those skilled in the art that numerous tests can be incorporated if information regarding the particular type of service is transmitted along with the claim request. These tests are easily incorporated in the chain of tests illustrated in FIG. 11 and are considered to be within the scope of the present invention.

Figure 12:
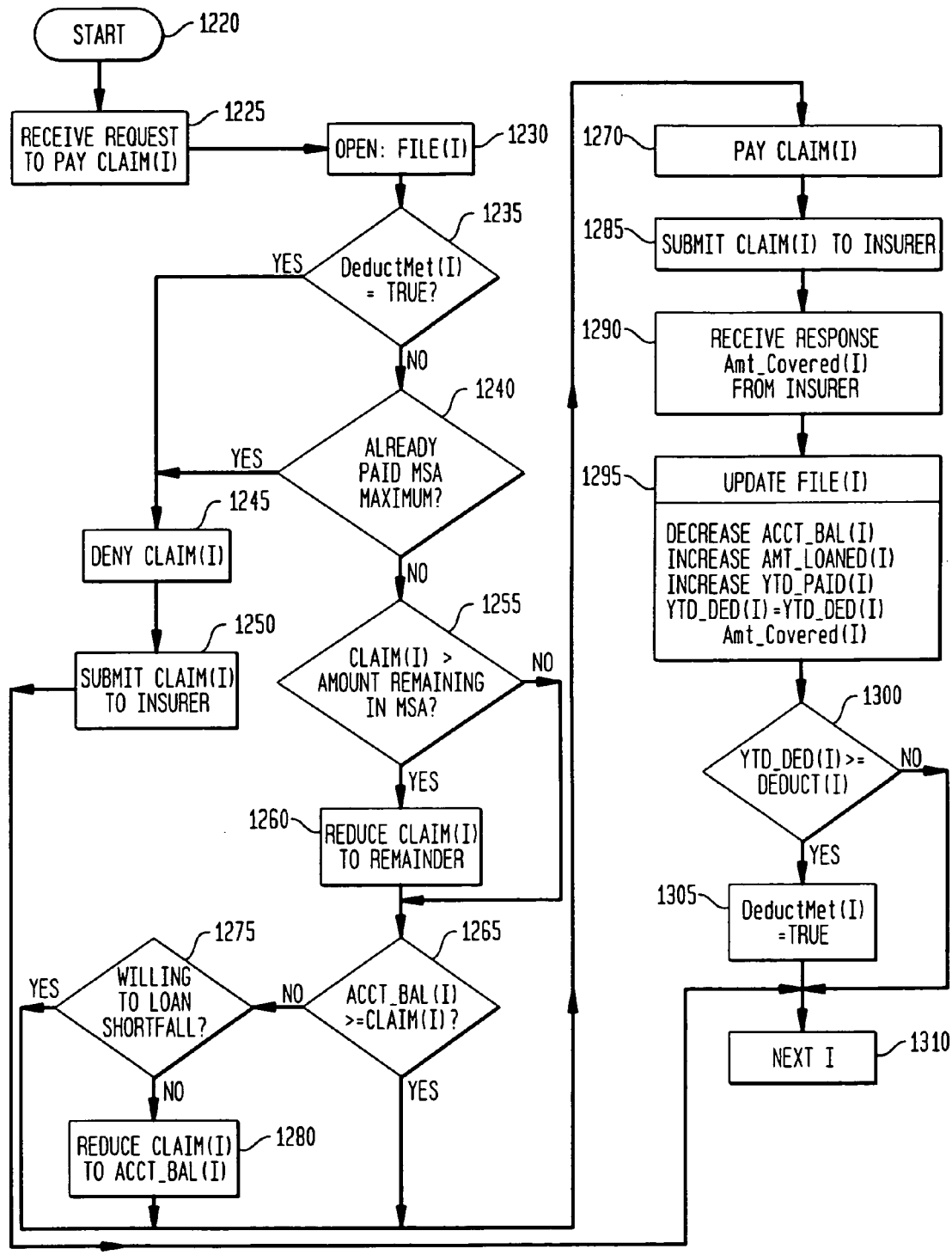
FIG. 12 is a logic flow diagram illustrating an alternative embodiment of the real-time transaction processing routine in accordance with the invention.

FIG. 12 depicts an alternative embodiment to the claims processing routine presented in FIG. 10. In this embodiment, a real-time network link exists to the insurer holding the catastrophic insurance policy of the MSA so that a paperless claims system can be implemented. Each MSA account now contains a logical variable indicating whether the deductible for the insurance policy has been met by previous claims. Thus, the process conceptually starting ag block 1220, when a claim is received (block 1225) and the associated file opened (block 1230), block 1235 first tests this variable before proceeding with further claim processing. If the deductible has been met, the claim is denied payment from MSA funds (block 1245) and electronically forwarded via the network to the insurer for their processing (block 1250), thus providing a paperless claims processing system. Blocks 1240 through 1270 are conceptually the same as steps 1115 through 1140 in FIG. 10. Test 1235 differs from test 1240 in that all claims paid from MSA funds may not be applicable towards satisfying the deductibility limits/requirements of the insurance policy. For example, a subscriber may choose to expend his MSA funds on experimental medical procedures. As these procedures are typically not covered by an insurance policy, they would not count towards the policy deductible even though the administrator may authorize payment of MSA funds for those purposes. In such an instance, the MSA maximum may have been paid, while none of the deductible has been met.

To keep track of the status of the deductible, after each claim is processed it is submitted to the insurer (block 1285). This transmission will include all claim data, as well as information pertaining to whether the claim was reduced due to insufficient MSA balance (step 1280) or MSA maximum reached (step 1260). The insurer can then consider application of these amounts to the policy deductible. In response, the insurer provides (block 1290) an acknowledgment indicating how much of the original CLAIM(I) it will apply towards the deductible. In block 1295, this amount, Amt-Covered(I), is accumulated in an MSA variable, YTD-DED (I), so that a record is kept of how much has been applied to the insurance deductible so far for the year. Block 1295 performs other account updating as described in conjunction with FIG. 10. As a final step, processing continues to test 1300 to compare the year-to-date deductible to the account parameter, DEDUCT(I). If the deductible for the insurance policy has been met, the logical variable DeductMet(I) is set to TRUE in block 1300 before processing ends for this claim request at block 1310.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A system for managing a composite account comprising a plurality of subaccounts linked to a master account and associated with an individual, wherein each subaccount is directed to a particular profile of financial attributes and capabilities, comprising:

master account processing means for creating and managing said master account;

one or more electronic databases electronically linked to said master account processing means and configured to store data regarding said master account and said linked subaccounts;

master account input means for receiving account transactions from said individual corresponding to account activity inquiries and account asset transfers into and out of said master account;

subaccount processing means for creating and controlling subaccounts associated with said master account, wherein said subaccount processing means permits a particular profile of subaccount transactions to be associated with each subaccount, said profile representing a subset of transaction functions or identifications associated with said master account;

paperwork control means for generating necessary paperwork associated with each master account and each of said one or more subaccounts, for sending such paperwork to said individual, and for determining that such paperwork has been received from and completed by said individual; and account reporting means for creating and displaying or outputting reports of transactions undertaken for said master account and at least one of said one or more subaccounts on a periodic basis.

2. A system as in claim 1, wherein at least one of said subaccounts is a medical savings account.

3. A system as in claim 2, further comprising means for transferring funds from said medical savings account for the payment of medically-related goods and services.

4. A system as in claim 3, wherein payments made from said medical savings account are made to said master account, from which at least one of insurance premium and medical expense payments are made electronically.

5. A system as in claim 3, wherein at least one of said subaccounts is a bank account, and wherein said system is operable to automatically and periodically transfer funds from said bank account to said medical savings account.

6. A system as in claim 5, wherein said system is operable to transfer funds from another subaccount to said medical savings account if there are insufficient funds in said bank account.

7. A system as in claim 3, wherein said system is operable to transfer all funds remaining in said medical savings account at year-end into another subaccount comprising a long-term investment vehicle.

8. A system as in claim 3, further comprising a real-time link to an insurer computer and means to implement a paperless claims system.

9. A system as in claim 1, further comprising means for processing said individual's desired fee allotment between said master account and said subaccounts.

10. A system as in claim 9, wherein said means for processing said individual's desired fee allotment is operable to charge all fees against said master account in a manner that provides cost savings to said individual over having fees charged against subaccounts.

* * * * *